G. C. EATON.
FEEDING DEVICE FOR POULTRY.
APPLICATION FILED APR. 14, 1919.

1,350,013. Patented Aug. 17, 1920.

WITNESSES:
Daniel H O'Brien
Charles L Gookins

INVENTOR
George C. Eaton
BY
Harry M. Love
ATTORNEY

UNITED STATES PATENT OFFICE.

GEORGE C. EATON, OF NORWICH, NEW YORK.

FEEDING DEVICE FOR POULTRY.

1,350,013.   Specification of Letters Patent.   Patented Aug. 17, 1920.

Application filed April 14, 1919. Serial No. 289,968.

*To all whom it may concern:*

Be it known that I, GEORGE C. EATON, a citizen of the United States, residing at Norwich, in the county of Chenango and State of New York, have invented certain new and useful Improvements in Feeding Devices for Poultry, of which the following is a specification, reference being had therein to the accompanying drawing.

My invention relates to an improved feeder for poultry and is shown and described as a milk feeder particularly, though it is applicable to use in feeding of mash or grain as well as a liquid.

Among the special features of the device is the fact that it is perfectly sanitary and easily cleaned, it renders the contents air-cooled and protects them from dirt and weather, is portable and attractive.

Figure 1:
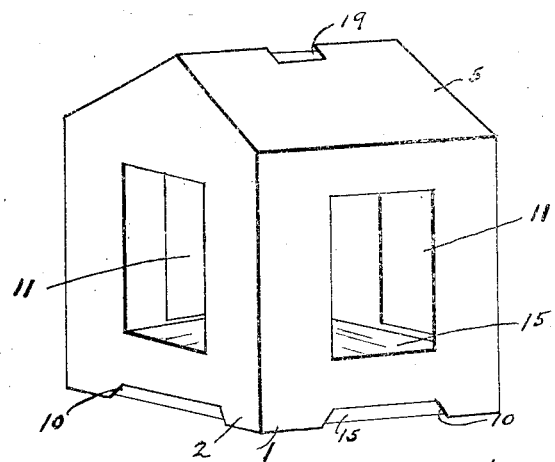
Figure 3:
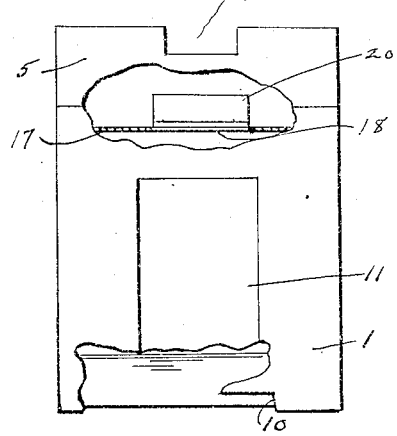
Figure 2:
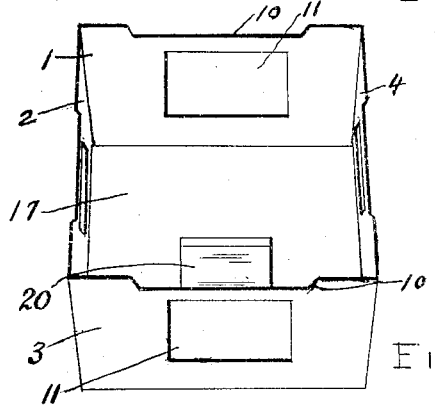
Figure 4:
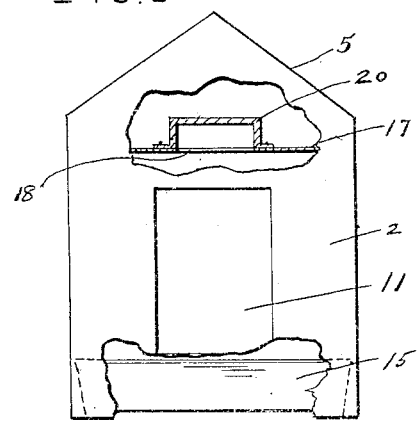
Figure 5:
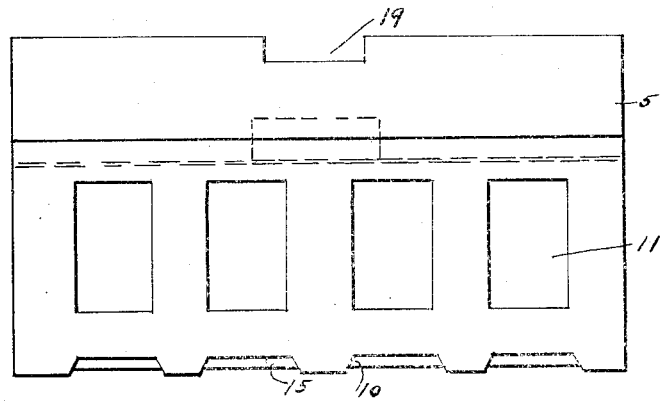

In the drawings Figure 1 is a perspective view. Fig. 2 is a perspective view of the interior of the device (the food receptacle removed). Fig. 3 is a side view and Fig. 4 an end view, parts being broken away in each view. Fig. 5 is a side view of a form constructed to contain several dishes for a variety of feeds.

Referring to the drawings in detail 1 and 3 represent side-walls and 2 and 4 end-walls the latter being upwardly extended to provide gable ends. 5 is the roof, of such pitch as preferred, supported by the ends and sides.

The sides and ends are made of such size as to form the feeder of such proportions as desired, for a single pan or dish or for a number of them.

The different parts of the device may be made more or less integral or built up.

In the form shown in Fig. 1 each side and end is cut away at the bottom as at 10 thus providing openings for the free contact of fresh air against the pan 15.

Any number of such openings of proper size may be provided, according to the size of the feeder and the number of containers therein.

Each side and end has a feeding opening 11 of suitable size for the fowls to reach the contents of the pan and not injure the comb or wattles. These openings may be of such a size and number as best suited to the use to be made of the feeder.

The device contains a false roof 17. This consists of a ceiling in the feeder, covering the space inclosed by the side-walls, but having an aperture as at 18. The roof 5 has a corresponding aperture 19, of suitable size.

Between the two openings is a plate or guard 20, in this case supported on the false roof. This plate protects the contents of the feeder from the weather, leaves, etc., and also acts as a deflector of the air-currents that pass up through openings at 18 and causes a draft to change the air in the chamber between the two roofs which otherwise would become heated and heat the feed, the draft also drawing fresh air in through the side openings and those at the bottom.

The result is that a current of fresh air constantly moves against the sides of the dish or pan and over it thus keeping the contents fresh and cool.

The food container, 15, is shown as a pan of such size that the feeder sets down over it with a slight space between the edge of the pan and the walls of the feeder, the edge of the pan being slightly below the sill of openings 11.

The preferable shape of the dish or pan allows air to pass between the sides of the pan and the walls of the feeder.

The feeder is readily lifted from place over the pan which can be removed for cleaning and sterilizing, the opening 19 being convenient for lifting the top. The size of the feeder and the height of the pan within it render the feeder stable and its construction protects the contents from litter and keeps the fowls out of the pan.

The device may be supported on a shelf or other structure if desired. Various modifications may be made without departing from the scope of the invention.

Having described my invention, what I claim and desire to secure by Letters Patent is:

1. In a device of the character described a cover being open at the bottom to permit free placing of the same over, and removing from, a container, having side-walls with feed-openings and cut away at the bottom for access of air against the container and having a ceiling and a roof with an aperture in each, oppositely disposed, and a hood interposed between the apertures whereby air-currents have passage from contact with the container out of the top of the device and a container, in combination.

2. In a device of the character described, the combination of a feed pan and a cover, open at the bottom, formed with side-walls cut away at the lower edge and having a roof with a ceiling spaced below the same forming a chamber retarding the reflection of heat from the roof, the roof and ceiling being oppositely apertured with a hood between whereby to generate air-currents from below through the chamber and cool the same.

3. A device of the character described, having a cover with side-walls open at the bottom and adapted to be set over a container, the side-walls being spaced from the container and having a gable roof and a ceiling spaced below the same, the ridge of the roof being cut away at a given place and the ceiling being apertured below such place, and a deflecting hood above the aperture in the ceiling, the side-walls being also cut away whereby to allow free contact of air with the container and its passage out the top.

In testimony whereof I hereunto affix my signature in the presence of two witnesses.

GEORGE C. EATON.

Witnesses:
  CHAS. B. CRANDALL,
  HIRAM J. BURLINGAME.